United States Patent Office 3,272,728
Patented Sept. 13, 1966

3,272,728
METHOD OF PRODUCING ACTIVATED
ELECTRODES
Axel Hahndorff, Berlin-Siemensstadt, and Günther Barthel, Berlin-Grunewald, Germany, assignors to Pintsch Bamag Aktiengesellschaft, Berlin, Germany
No Drawing. Filed Oct. 3, 1961, Ser. No. 142,532
Claims priority, application Germany, Oct. 7, 1960,
P 25,800
5 Claims. (Cl. 204—35)

The present invention relates to an electrode and to a method of making the same and, more particularly, the present invention is concerned with an electrode adapted for use in electrolytic cells for the decomposition of water and with facilitating operation of such electrolytic cells at a relatively low overvoltage.

The economy of industrial electrolytic decomposition of water depends to a very considerable degree on reducing the overvoltage which occurs upon electrolytic separation of hydrogen and oxygen. For instance, a reduction in the operating voltage of such electrolytic cell by 0.2 volts will save about 10% of the total energy requirements.

It has been suggested to roughen the surface of electrodes for such electrolytic cells, or to activate such electrodes by applying to the surface thereof a metal layer for instance of chromium, tantalum, plantinum or sponge iron, in order to reduce the hydrogen overvoltage. However, these prior art activating layers do not represent an ideal solution of the problem, inasmuch as these layers are expensive to produce and/or possess the desired effect only for a relatively short period of time.

Furthermore, several suggestions have been made for producing such activating layers on the electrode surface, however, it is difficult to apply such layers without interfering with the structural conditions and shape of the conventional electrolytic cells. The foregoing holds true for instance for the so-called double electrodes of Raney-nickel. It has been suggested to use Raney-nickel for reducing the overvoltage in electrolytic processes. However, it is a characteristic feature of Raney-nickel electrodes that the same start to glow when exposed to air. This, of course frequently is undesirable. Furthermore, the production of electrodes provided with Raney-nickel activating layers requires high pressures and high temperatures. In addition, the above-mentioned double skeleton electrodes have the further disadvantage that they possess relatively large cross-sectional dimensions, due to the fact that these electrodes are sinter bodies. These relatively large cross-sectional dimensions are disadvantageous with regard to the overall structural features of the electrolytic cell.

It is therefore an object of the present invention to provide an electrode and a method of making the same, which electrode will be capable of reducing the overvoltage which occurs during electrolytic decomposition of water, i.e. will be capable of operating at a relatively low overvoltage, and which electrodes can be produced in a simple and economical manner.

Other objects and advantages of the present invention will become apparent from a further reading of the specification and of the appended claims.

With the above and other objects in view, the present invention contemplates an electrode adapted for use in the electrolytic decomposition of water, the electrode comprising, in combination, a metallic core, and a metallic activating layer galvanically joined to at least a portion of the metallic core, whereby due to the galvanically joined activating layer on said electrode the overvoltage during electrolytic decomposition of water is reduced.

The present invention is also concerned with a method of producing electrodes for use in electrolytic cells, which comprises the steps of galvanically applying to at least a portion of the surface of a metallic electrode core a metallic surface layer adapted to be activated, and activating the thus applied metallic surface layer.

According to a preferred embodiment of the method of the present invention, the same comprises the steps of galvanically applying in an electrolytic bath including a complex-forming substance selected from the group consisting of the cyanides, pyrophosphates and sulfamates to at least a portion of the surface of a metallic electrode core consisting essentially of a substance selected from the group consisting of nickel, nickel alloys, copper, copper alloys, and iron, a metallic surface layer consisting essentially of an alloy of at least one first metal selected from the group consisting of nickel, cobalt, iron and copper, said alloy also containing zinc as a second metal, said surface layer being adapted to be activated by dissolution of at least a portion of said second metal; and treating said metallic surface layer with an alkaline liquid in which said second metal is soluble and which substantially does not affect said first metal, so as to dissolve and thus remove said second metal from said metallic surface layer of said electrode, thereby activating the same.

Thus, according to the present invention, electrodes which are to be used for electrochemical purposes, particularly electrodes which are to be used for the electrolytic decomposition of water, are galvanically supplied with an activating surface capable of reducing the overvoltage which occurs during the electrolytic decomposition of water. The activating layer is formed by galvanic deposition of an alloy which is capable to be activated and which is deposited on electrodes which may have any desired shape or which may be shaped to their final configuration after the activating layer has been galvanically applied. The alloy which forms the activating layer i.e. which can be activated, preferably will consist of a component such as nickel or nickel-copper which is capable of reducing the overvoltage, and of a further component such as zinc which can be fully or partially dissolved and thus removed during activation of the surface layer.

By applying the activating layer by electro-deposition, i.e. galvanically, the shape of such hydrogen gas producing electrolytic cells and of the electrodes thereof can be chosen as desired and it will not be necessary to consider the activating of the electrodes as a feature which has to be taken into consideration with respect to the shape and overall configuration of the apparatus. Thus, according to the present invention it is possible to activate profiled pre-electrodes, such as corrugated or perforated sheets, wire mesh structures, and the like, and this process can be carried out in a very simple and effective manner. It has been found that by galvanically applying relatively thin zinc-nickel-copper layers, or zinc-nickel layers onto the surface of the electrode core, and subsequent treatment of the thus formed electrodes with alkaline solutions, it will be possible to obtain electrodes which will operate under a considerably reduced overvoltage.

The electrodes according to the present invention differ from those made for instance with a surface layer of Raney-alloys by the fact that the activating layer according to the present invention does not display any pyrophoric tendencies. Furthermore, the process according to the present invention which includes galvanic application of an alloy and subsequent dissolving of portions of the thus formed alloy coating, can be carried out in a much more simple and economical manner than the process which leads to the Raney electrodes and which includes melting, compressing and sintering steps.

It is possible, for instance, according to the present invention to apply galvanically an activating layer consisting of a zinc-nickel-copper alloy of the type known as "nickel-silver" or "German silver." The thus formed activating layer is then further treated with an alkaline solution in order to dissolve at least a portion of the zinc content of the alloy coating and thereby to activate the electrode and to reduce the overvoltage which will occur upon use of the electrode in a process of water decomposition or the like.

Furthermore it has been found that very good results, according to the present invention can be obtained by galvanically depositing a zinc-nickel layer on the electrode core portion. The deposition of the zinc-nickel layer may be carried out in an electrolytic bath which is formed on the basis of complex-forming cyanides, pyrophosphates or sulfamates. After thus forming a zinc-nickel coating on the electrode surface, the electrode is then treated in a solution which will dissolve at least a portion of the zinc and thus greatly increase the free surface of the electrode.

Surprisingly it has been found that the deposition of pure zinc-nickel layers from bath compositions including cyanides, pyrophosphates or sulfamates will give very good results and, in fact, this appears to be an effective and economical method for applying activating layers according to the present invention which are then activated by dissolution of zinc component thereof.

Such complex-forming bath may consist for instance of a solution of 100 gr./liter $Zn_2P_2O_7$, 480 gr./liter $K_4P_2O_7$ and 20 gr./liter $NiCl \cdot 6H_2O$.

Electrodeposition of the activating layer is preferably carried out at a somewhat elevated temperature, for instance at a temperature between about 70 and 80° C., whereby the current yield will reach between about 15 and 20%.

Such activating layers as described above, may be produced in varying thicknesses, depending on the specific requirements in any given case. Good results were achieved with activating layers which were deposited in a thickness of between 30 and 50 microns.

According to the present invention the activating layer which has been galvanically formed on the electrode core will then be further treated with alkaline solutions or cyanide solutions, for instance with 30% aqueous sodium-hydroxide solutions. The leaching out of the zinc or other soluble constituents of the activating alloy can be carried out at room temperature or at elevated temperatures, depending on the specific properties or the degree of activation desired in the finished product.

For instance, cathode surfaces which were treated as described above, showed against metallic nickel or metallic iron a hydrogen overvoltage which was reduced by between 0.25 and 0.3 volt.

It is a particular advantage of the present invention that by galvanic deposition of the activating layer the same can also be applied to profiled electrode blanks, such as perforated sheets or wire mesh and that in this manner in a very simple and economical way an activating layer which need not consist of noble metals can be applied to a suitable electrode core.

The electrode core to which the activating layer is to be applied, may, for instance, consist of nickel or nickel alloys, copper or copper-alloys, or iron. The activating layer is then applied by electrodeposition and will consist of an alloy which includes constituents which can be dissolved by treatment of the electrode with the activating layer thereon in a suitable solution such as an alkaline or cyanide solution. By thus dissolving and removing the inactive alloy constituents, the operative surface of the active alloy constituent will be greatly increased.

In addition to increasing the active surface by treating of the activating layer with alkali or cyanide solutions, such solutions also activate the surface of the remaining active metal of the coating alloy. Thus, as the result of such treatment, the remaining activated surface will contain an increased number of active or reactive centers or points which will facilitate the binding of hydrogen gas or other gases by the active metal.

Thus, it is an important feature of the present invention to combine the galvanic deposition of the activating layer on the electrode core with the subsequent, preferably chemical, treatment of the activating layer, namely, the removal therefrom of the alloy constituent which is soluble in the treating solution, so that by such chemical after-treatment, the available free surface of the activating portion of the alloy and the activation of the same will be increased. In special cases, the increase in the available surface area of the activating coating may also be accomplished by mechanically roughening the same.

The coating which is thus galvanically applied to the electrode core, may consist for instance of any of the following alloys: nickel-zinc, nickel-copper-zinc, cobalt-zinc, nickel-cobalt-zinc, iron-zinc, copper-zinc and silver-copper.

By treating the zinc or aluminum-containing alloy coatings with aqueous alkaline solutions, such as a 30% aqueous sodium hydroxide solution, the zinc and/or aluminum can be substantially completely dissolved and removed from the alloy coating. Thereby, on the one hand, the free surface of the remaining activating coating will be increased, and on the other hand, the thus increased surface will be activated so that hydrogen gas or oxygen gas can be bound on thus activated surface portions at an overvoltage which will be between 0.1 and 0.2 volts less than the overvoltage which would occur on electrodes of the same metal composition, which, however, have not been activated. Since, this reduction of between 0.1 and 0.2 volt will occur on the cathode as well as on the anode, the entire voltage which is required for water decomposition or the like will be reduced by between about 0.2 and 0.3 volt by using electrodes which have been activated in accordance with the present invention.

The quantitative composition of the alloys of which the activating layer according to the present invention is to be formed, may vary within rather broad ranges. Good results were obtained, for instance with nickel-zinc alloys in which the nickel content was maintained within the range of between 30 and 70%.

The activating solution which will dissolve a portion of the galvanically applied coating, may consist for instance of an aqueous sodium or potassium-hydroxide solution having a concentration of between 5 and 30% and being applied preferably at a temperature between 30 and 40° C. for a period of between 15 and 300 hours.

Preferably, the activating layer which has been galvanically applied to the electrode core is first treated for a short period of time with 5% aqueous hydrochloric acid and thereafter activated with potassium or sodium hydroxide as described above.

The following examples are given as illustrative only without, however limiting the invention to the specific details described therein.

*Example I*

Anodes as well as cathodes suitable for the electrolytic decomposition of water are produced by sand blasting the electrode blank, thereafter treating the electrode blank in a cyanide-copper bath so as to form a thin copper layer on the electrode blank and then galvanically applying a nickel-zinc alloy containing 60% nickel from a galvanic pyrophosphate bath containing 210 gr./liter of $K_4P_2O_7$, 49 gr./liter $Zn_2P_2O_7$ and 10 gr./liter $NiCl_2 \cdot 6H_2O$.

The current yield at a current density of between 1 and 2 amperes per hundred square centimeter amounts to between 10 and 16%. The galvanic bath is provided with a nickel anode.

The thus coated electrode blank is then rinsed and thereafter immersed for a prolonged period of time in an aqueous sodium hydroxide solution of 30% concentration. Thereby, the zinc component of the coating is dissolved under formation of hydrogen gas.

The thus produced electrodes can be use for the electrolytic decomposition of 25% aqueous potassium-hydroxide at an operating voltage of between 1.8 and 1.9 volts, at a current density of 20 amperes per 100 square centimeters.

*Example II*

The electrode core sheets are sand blasted. Thereafter the sheets are galvanically coated while immersed in a chloride bath having a temperature of 60° C. and containing 310 gr./liter of $NiCl_2 \cdot 6H_2O$ and 160 gr./liter of $ZnCl_2$. A coating consisting of zinc-nickel alloy, containing about 60% nickel is thus formed on the electrode blank.

At a current density of between 10 and 15 amperes per 100 square centimeters, a current yield of between 93 and 94% was achieved. The desired coating is formed within a period of 20 minutes.

Thereafter, the thus galvanized electrodes are activated for 15 hours in warm 30% aqueous sodium hydroxide solution whereby again zinc is dissolved under formation of hydrogen gas.

The thus formed electrodes when used for the electrolytic decomposition of 25% aqueous potassium hydroxide at a current density of 20 amperes per 100 square centimeters and at a temperature of 80° C. operate at a voltage of between about 1.7 and 1.8 volts.

*Example III*

The sand blasted electrode sheets are coated with a thin copper layer by being immersed in a cyanide copper bath.

Thereafter a zinc-nickel alloy containing about 40% nickel is deposited on the sand blasted sheet in a cyanide alloying bath being maintained at a temperature of 80° C. and containing 36 g./liter of $K_2Zn(CN)_4$, 3.2 gr./liter KCN and 32 gr./liter $K_2Ni(CN)_4$.

The current density is maintained at about 1 ampere per 100 square centimeter and a cathodic current yield of about 75% is achieved.

The thus coated electrode is rinsed and then immersed for 15 hours in warm, 30% sodium hydroxide, whereby again the zinc component of the electrode coating is dissolved under formation of hydrogen gas.

The thus formed activated electrodes, when used for the decomposition of 25% aqueous potassium-hydroxide at a current density of 20 amperes per 100 square centimeters and at a temperature of about 80° C. operate at an operating voltage of between 1.7 and 1.8 volts.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing electrodes for use in electrolytic cells, the steps of galvanically applying to at least a portion of the surface of a metallic electrode core as a metallic surface layer an alloy consisting essentially of a first component capable of reducing over-voltage at said electrode, and of a further component adapted to be at least partially dissolved so as to activate said surface layer by such at least partial dissolution of said second component; and dissolving at least a portion of said second component substantially without affecting said first component, thereby activating the thus applied metallic surface layer.

2. In a method of producing electrodes for use in electrolytic cells, the steps of galvanically applying to at least a portion of the surface of a metallic electrode core a metallic surface layer consisting essentially of an alloy of a first metal selected from the group consisting of nickel, cobalt, iron and copper, said alloy also containing zinc as a second metal and being adapted to be activated by dissolution of at least a portion of said second metal; and dissolving at least a portion of the second metal of said metallic surface layer thereby activating the same and increasing the free surface area thereof.

3. In a method of producing electrodes for use in electrolytic cells, the steps of galvanically applying to at least a portion of the surface of a metallic electrode core a metallic surface layer consisting essentially of an alloy of a first metal selected from the group consisting of nickel, cobalt, iron and copper, said alloy also containing zinc as a second metal and being adapted to be activated by dissolution of at least a portion of said second metal; and treating said metallic surface layer with a liquid in which said second metal is soluble and which substantially does not affect said first metal, so as to dissolve and thus remove said second metal from said metallic surface layer of said electrode, thereby activating the same.

4. In a method of producing electrodes for use in electrolytic cells, the steps of galvanically applying to at least a portion of the surface of a metallic electrode core a metallic surface layer consisting essentially of an alloy of a first metal selected from the group consisting of nickel, cobalt, iron and copper, said alloy also containing zinc as a second metal and being adapted to be activated by dissolution of at least a portion of said second metal; and treating said metallic surface layer with an alkaline liquid in which said second metal is soluble and which substantially does not affect said first metal, so as to dissolve and thus remove said second metal from said metallic surface layer of said electrode, thereby activating the same.

5. In a method of producing electrodes for use in electrolytic cells, the steps of galvanically applying in an electrolytic bath including a complex-forming substance selected from the group consisting of cyanides, pyrophosphates and sulfamates to at least a portion of the surface of a metallic electrode core consisting essentially of a substance selected from the group consisting of nickel, nickel alloys, copper, copper alloys, and iron, as a metallic surface layer, an alloy consisting essentially of a first component capable of reducing overvoltage at said electrode during operation of said electrolytic cell, and of a second component adapted to be at least partially dissolved so as to activate said surface layer by such at least partial dissolution of said second component; and dissolving at least a portion of said second component substantially without affecting said first component, thereby activating the thus applied metallic surface layer.

References Cited by the Examiner

UNITED STATES PATENTS

| | | |
|---|---|---|
| 1,077,920 | 11/1913 | Stevens. |
| 2,927,886 | 3/1960 | Allen et al. _____ 204—35 |

FOREIGN PATENTS

| | | |
|---|---|---|
| 592,130 | 2/1934 | Germany. |
| 135,211 | 11/1929 | Switzerland. |

OTHER REFERENCES

Barrett, R. C.: Plating of Nickel, Cobalt, Iron and Cadmium from Sulfamate Solutions. In Technical Proceedings of the Forty-Seventh Annual Convention, American Electroplaters Society, July 24–28, 1960, pp. 170 to 175.

JOHN H. MACK, *Primary Examiner.*

D. R. JORDAN, *Assistant Examiner.*